Patented Apr. 20, 1937

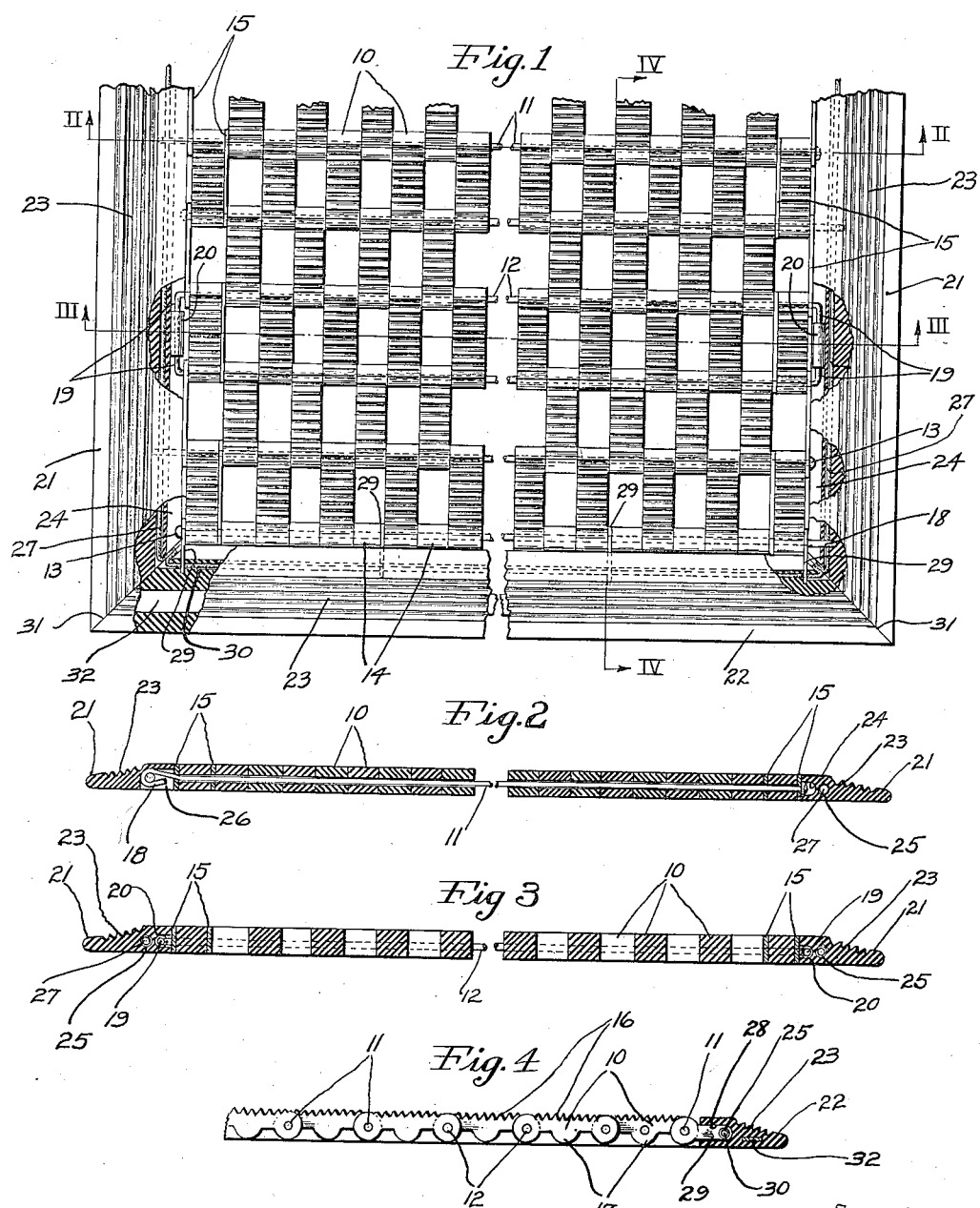

2,077,901

UNITED STATES PATENT OFFICE 2,077,901

ARTICULATED FLOOR MAT

Harry R. Russon, Akron, Ohio, assignor to Wingfoot Corporation, Wilmington, Del., a corporation of Delaware Application February 27, 1935, Serial No. 8,524

17 Claims. (Cl. 20—74)

The present invention relates to articulated floor mats and it has particular relation to floor mats fabricated from a plurality of links of rubber or the like pivotally connected with one another so as to permit the mat to be rolled or folded.

One of the objects of the present invention is to provide a mat of the character described having a marginal nosing or border which may quickly and easily be secured in position without rupturing the rubber of the same.

Another object of the invention is to provide a mat of the type referred to having a marginal nosing or border secured thereto by novel and improved means which will permit the mat to be rolled upon itself or folded without causing the nosing to become separated from the tread portion of the mat.

Still another object of the invention is to provide improved means for securing the side and end strips of the nosing to the mat in close contact therewith, the strips being so constructed as to conceal the securing means from view.

A further object of the invention is to provide a mat of the character referred to in which the pivot rods connecting the several tread links are bent over to prevent the displacement of the links axially thereof and in which the bent ends of the pivot rods are secured in a predetermined position so as to eliminate wear on the adjacent edge of the nosing strip due to the pivotal movement of the rods.

A still further object of the invention is to provide a floor mat fabricated from a plurality of rubber tread links in which the individual links are so shaped as to exert a very positive gripping action with the floor.

Another object of the invention is to provide a floor mat in which the several assembling operations are materially simplified and, although being of an exceptionally rugged and compact construction, presents a very neat and attractive appearance.

With such objects in view, as well as other advantages which may be incident to the use of the improvements, the invention consists in the parts and combinations thereof hereinafter set forth and claimed, with the understanding that the several necessary elements constituting the same may be varied in proportions and arrangement without departing from the nature and scope of the invention as defined in the appended claims.

In order to make the invention more clearly understood, there are shown in the accompanying drawing means for carrying the invention into practical effect without limiting the improvements in their useful application to the particular constructions and arrangement which, for the purpose of explanation, have been made the subject of illustration.

In the accompanying drawing:

Fig. 1 is a fragmentary plan view with parts broken away of an articulated floor mat constructed in accordance with the present invention;

Fig. 2 is a transverse sectional view taken on line II—II of Fig. 1;

Fig. 3 is a transverse sectional view taken on line III—III of Fig. 1;

Fig. 4 is a fragmentary longitudinal sectional view taken on line IV—IV of Fig. 1.

Referring to the drawing, an articulated floor mat embodying the present improvements is shown as comprising a plurality of tread links 10 of rubber or the like which are arranged in staggered side-by-side lapping relation and which are connected together by pivot rods 11 and 12, the former being provided with preformed heads 13. Cylindrical spacing members 14, also of rubber, are carried by the rods 11 between the tread links 10 at the opposite ends of the mat so as to hold these links in their proper positions and to impart a finished appearance to the mat. In order to prevent the mat from becoming unduly distorted or stretched in a longitudinal direction the several pivot rods 11 and 12 are connected adjacent to the side edges of the mat by relatively thin metallic tie plates 15, certain of which engage the outer surfaces of the end portions of the extreme outside tread links 10, spanning the space therebetween, and certain others of the tie plates 15 being disposed between these outside tread links and those next adjacent thereto (Fig. 1).

The tread links 10 are preferably of molded construction and are formed with serrated upper surfaces 16 so as to afford a secure footing, and also with substantially undulatory or corrugated lower surfaces 17 for anti-slipping contact with the floor (Fig. 4).

In assembling the link or tread portion of the mat hereinabove described, the tread links 10 and tie plates 15 are arranged on the pivot rods 11 and 12 in the positions shown in Fig. 1. This portion of the mat is then placed under lateral compression in any suitable manner and the projecting ends of the pivot rods 11 bent back upon themselves so as to form loops or eyes 18 (Fig. 2). The ends of the pivot rods 11, however, are bent horizontally through an angle of substantially 90° so as to lie parallel to the sides of the outer tie plates 15, as indicated at 19 in Fig. 1. As shown in this figure, the pivot rods 11 are arranged in alternate pairs with the bent-over ends 19 thereof extending toward one another and these ends are secured in such position by clamping members or clips 20 of substantially cylindrical shape which tightly embrace the ends 19 of the pivot rods 12. These members 20 positively hold the ends 19 against movement and prevent them from fraying or otherwise mutilating the adjacent edges of the nosing strips, presently to be described, as would be the case if the ends 19 were free to swing with any rotary movement of the pivot rods 12. When the lateral pressure is relieved the tread links 10, expand, thus forcing the tie plates 15 into abutting engagement with the doubled-back ends of the loops or eyes 18, and also into engagement with the sides of the clamping members 20 as shown in Figs. 2 and 3.

As previously mentioned, the link or tread portion of the mat is surrounded by a marginal nosing having side strips 21 and end strips 22. These strips are also preferably constructed of molded rubber and are each formed with a serrated, beveled portion 23, with a groove or channel 24 extending longitudinally along its inner edge and with a hole 25 also extending longitudinally thereof but in spaced relation to the channel 24. The side strips 21 of the nosing are also provided with a plurality of vertical slots or recesses 26 (Fig. 2) which intersect the holes 25 at intervals and which are so shaped and positioned as to receive the loop or eye portions 18 of the rods 11. These side strips 21 of the nosing are secured in position by means of a flexible wire 27, preferably of the piano-wire type, which is threaded through the holes 25 and through the loops or eyes 18. When thus secured in position, the strips 20 of the nosing lie in close proximity to the metal tie plates 15 and with the heads 13 of the pivot rods 11, and the bent-over ends 19 and clamping members 20 of the pivot rods 12 all disposed within the channels or grooves 24, where these parts are completely concealed from view.

The end portions 22 of the nosing strips are provided with relatively narrow vertical slots or recesses 28 (Fig. 4) which also intersect the holes 25 at intervals and which are adapted to receive the outer ends of a plurality of metallic stub-links 29. These stub-links 29 are carried by the outermost pivot rods 11 between certain of the tread links 10 and the adjacent spacing members 14. The end strips 22 of the nosing are each secured in position by means of a rod 30 which is inserted through the hole 25 and through the stub links 29.

The side and end strips 21 and 22 of the nosing are mitered adjacent to the corners of the mat, as indicated at 31 in Fig. 1 and are vulcanized together, thus providing a very rugged construction having a neat and finished appearance.

From the foregoing it will be apparent that an articulated floor mat is provided which may be freely rolled or folded without danger of the marginal nosing becoming separated therefrom and also a mat in which the several securing means are concealed from view.

If desired, metal straps 32 may be inserted in suitable longitudinally extending holes provided in the end strips 22 of the nosing so as to reinforce these strips against flexing.

Moreover, the metallic tie plates 14 may all be arranged along the outer surfaces of the extreme outer row of tread links 10 in lapping, contiguous relation with one another.

Also, if desired, the clamping members 20 may be dispensed with and the bent-over ends 19 of the pivot rods 12 soldered, welded or otherwise suitably secured to the adjacent tie plates 15 in order to maintain them in the desired position.

It may be found desirable also to dispense with the preformed beads 13 of the pivot rods 11 by employing rods with square-cut ends which may be bent over, as previously described in connection with the bent ends 19, or otherwise upset to prevent lateral displacements of the tread links 10.

Other modifications and changes in proportion and arrangement of the several necessary elements constituting the invention may be made by those skilled in the art without departing from the nature and scope of the invention as defined in the appended claims.

What I claim is:

1. An articulated floor mat comprising a plurality of tread links arranged in staggered, side-by-side lapping relation, pivot rods connecting tread links, a nosing strip disposed about the marginal edges of said mat, said nosing strip having a hole extending longitudinally therethrough and a plurality of transversely extending recesses intersecting said hole at intervals, said hole and recesses being arranged entirely below the upper surface of said nosing strip to leave an unbroken upper tread portion on said nosing strip, metal stub-links connected with the pivot rods at opposite ends of said mat and extending into said recesses, and means extending through said hole and through said stub links for securing said nosing strip to the ends of the link portion of said mat.

2. An articulated floor mat comprising a plurality of tread links arranged in staggered, side-by-side lapping relation, pivot rods connecting tread links, a nosing strip disposed about the marginal edges of said mat, said nosing strip having a hole extending longitudinally therethrough and a plurality of transversely extending recesses intersecting said hole at intervals, said hole and recesses being arranged entirely below the upper surface of said nosing strip to leave an unbroken upper tread portion on said nosing strip, metal stub-links connected with the pivot rods at opposite ends of said mat and extending into said recesses, and a rod extending through said hole and through said stub links for securing said nosing strip to the ends of the tread link portion of said mat.

3. An articulated floor mat comprising a plurality of elongated rubber links arranged in staggered, side-by-side lapping relation with respect to one another; pivot rods extending through the lapping ends of said links for connecting the same together, certain adjacent pivot rods having their end portions at the same side of the mat bent toward one another to maintain said links against displacement, and certain other of said pivot rods each having a head portion at one end and an eye portion at the other end thereof to also maintain said links against displacement; clips for maintaining the bent end portions of said adjacent pivot rods in predetermined position; rigid tie plates connecting all of said pivot rods with each other adjacent to the outer side edges of said mat for reinforcing the same against longitudinal displacement relative to each other; side and end strips of rubber surrounding said links and together constituting a marginal nosing for said mat; said side strips each having its inner edge formed with a longitudinally extending open sided slot adapted to enclose the bent end portions and associated clips and the heads of said pivot rods, said side and end strips also each being formed with a longitudinally extending hole and with transversely extending slots intersecting said hole at intervals, the holes and slots in said side strip being adapted to receive the eye portions of said pivot rods; and a flexible wire extending through the holes in said side strips and through said eye portions for securing said side strips in position.

4. An articulated floor mat comprising a plurality of elongated rubber links arranged in staggered, side-by-side lapping relation with respect to one another; pivot rods extending through the lapping ends of said links for connecting the same together, certain adjacent pivot rods having their end portions at the same side of the mat bent toward one another to maintain said links against displacement, and certain other of said pivot rods each having a head portion at one end and an eye portion at the other end thereof to also maintain said links against displacement; cylindrical clips embracing the bent end portions of said adjacent pivot rods for preventing relative pivotal movement thereof, rigid tie-plates connecting all of said pivot rods with each other adjacent to the outer side edges of said mat for reenforcing the same against longitudinal displacement relative to each other; side and end strips of rubber surrounding said links and together constituting a marginal nosing for said mat; said side strips each having its inner edge formed with a longitudinaly extending open sided slot adapted to enclose the bent end portions and associated clips and the heads of said pivot rods, said side and end strips also each being formed with a longitudinally extending hole and with transversely extending slots intersecting said hole at intervals, the holes and slots in said side strip being adapted to receive the eye portions of said pivot rods; and a flexible wire extending through the holes in said side strips and through said eye portions for securing said side strips in position.

5. An articulated floor mat comprising a plurality of elongated rubber links arranged in staggered, side-by-side lapping relation with respect to one another; pivot rods extending through the lapping ends of said links for connecting the same together, certain adjacent pivot rods having their end portions at the same side of the mat bent toward one another to maintain said links against displacement, and certain other of said pivot rods each having a head portion at one end and an eye portion at the other end thereof to also maintain said links against displacement; means for maintaining the bent end portions of said adjacent pivot rods in predetermined positions; rigid tie-plates connecting all of said pivot rods with each other adjacent to the outer side edges of said mat for reinforcing the same against longitudinal displacement relative to each other; side and end strips of rubber surrounding said links and together constituting a marginal nosing for said mat; said side strips each having its inner edge formed with a longitudinally extending slot adapted to enclose the bent end portions and associated clips and the heads of said pivot rods, said side and end strips also each being formed with a longitudinally extending hole and with transversely extending slots intersecting said hole at intervals, the holes and slots in said side strip being adapted to receive the eye portions of said pivot rods; a flexible wire extending through the holes in said side strips and through said eye portions for securing said side strips in position; rigid stub links engaging at intervals the pivot rods at the ends of said mat and extending into the slots in said end strips arranged entirely below the upper surfaces of said strips; and means extending through the holes in said end strips and through said stub-links for securing said end strips in position, said side and end strips having mitered ends vulcanized together.

6. An articulated floor mat comprising a plurality of elongated rubber links arranged in staggered, side-by-side relation with respect to one another; pivot rods extending through the lapping ends of said links for connecting the same together, certain adjacent pivot rods having their end portions at the same side of the mat bent toward one another to maintain said links against displacement, and certain other of said pivot rods each having a head portion at one end and an eye portion at the other end thereof to also maintain said links against displacement; means for maintaining the bent end portions of said adjacent pivot rods in predetermined positions; rigid tie-plates connecting all of said pivot rods with each other adjacent the outer side edges of said mat for reinforcing the same against longitudinal displacement relative to each other; side and end strips of rubber surrounding said links and together constituting a marginal nosing for said mat; said side strips each having its inner edge formed with a longitudinally extending slot adapted to enclose the bent end portions and associated clips and the heads of said pivot rods, said side and end strips also each being formed with a longitudinally extending hole and with transversely extending slots intersecting said hole at intervals, the holes and slots in said side strip being adapted to receive the eye portions of said pivot rods; a flexible wire extending through the holes in said side strips and through said eye portions for securing said side strips in position; rigid stub-links engaging at intervals the pivot rods at the ends of said mat and extending into the slots in said end strips; and a rod extending through the holes in said end strips and through said stub-links for securing said end strips in position, said side and end strips having mitered ends vulcanized together.

7. An articulated floor mat comprising a plurality of elongated rubber links arranged in staggered, side-by-side lapping relation with respect to one another; pivot rods extending through the overlapping ends of said links for connecting the same together, certain adjacent pivot rods having their end portions at the same side of the mat bent toward one another to maintain said links against displacement, and certain other of said pivot rods each having a head portion at one end and an eye portion at the other end thereof to also maintain said links against displacement; cylindrical clips embracing the bent end portions of said adjacent pivot rods for preventing relative pivotal movement thereof; rigid tie-plates connecting all of said pivot rods with each other adjacent the outer side edges of said mat for reinforcing the same against longitudinal displacement relative to each other, side and end strips of rubber surrounding said links and together constituting a marginal nosing for said mat; said side strips each having its inner edge formed with a longitudinally extending slot adapted to enclose the bent end portions and associated clips and the heads of said pivot rods, said side and end strips also each being formed with a longitudinally extending hole and with transversely extending slots intersecting said hole at intervals, the holes and slots in said side strip being adapted to receive the eye portions of said pivot rods; a flexible wire extending through the holes in said side strips and through said eye portions for securing said side strips in position; rigid stub-links engaging at intervals the pivot rods at the ends of said mat and extending into the slots in said end strips arranged entirely below the upper surface of said strips; and a rod extending through the holes in said end strips and through said stub-links for securing said end strips in position, said side and end strips having mitered ends vulcanized together.

8. An articulated floor mat comprising a plurality of links assembled in staggered side-by-side lapping relation, pivot rods connecting said links and extending beyond the assembled links, some of said pivot rods having an opening in one end thereof and having the other end formed to prevent said links from being accidently moved off that end of the rod, border strips arranged at opposite marginal edges of said mat adjacent the ends of said rods, some of said rods having their openings adjacent one of said nosings and intermediate ones of said rods having their openings arranged adjacent the nosing on the opposite side of said mat, and retaining means extending through said openings to retain said nosings in fixed association with said rods, the other ends of said rods being free of direct attachment to said nosing.

9. An articulated floor mat comprising a plurality of links assembled in staggered side-by-side lapping relation, pivot rods connecting said links and extending beyond the assembled links, some of said pivot rods having an opening in one end thereof and having the other end formed to prevent said links from being accidently moved off that end of the rod, border strips arranged at opposite marginal edges of said mat adjacent the ends of said rods, some of said rods having their openings adjacent one of said nosings, and intermediate ones of said rods having their openings arranged adjacent the nosing on the opposite side of said mat, and retaining means extending through said openings to retain said nosings in fixed association with said rods, the other ends of said rods being free of direct attachment to said nosing and said nosings being recessed to receive the ends of said rods having the openings therein, and each having a longitudinal passage extending transversely through all of said recesses to receive the retaining means, and retaining means comprising a flexible cable passing through the openings in the rods arranged in said recesses.

10. An articulated floor mat comprising a plurality of links, pivot rods connecting said links and border strips, at least one of which is connected to said associated links and pivot rods by means of a cable extending through a longitudinal opening in said strip and having the ends thereof at the ends of said opening bent laterally against the end of said border strip and held in that position by the adjacent abutting border strips of adjacent sides.

11. An articulated mat comprising a central portion of articulated links and border strips surrounding said links, each having at least one longitudinal opening therein and a cable extending through said openings from one end thereof to the other, the ends of adjacent strips abutting against each other and held permanently in abutting relation, and the ends of said cables being bent transversely to lie between the abutting ends of said border strips whereby they are held against longitudinal displacement in their respective openings, said cables comprising a fastening means for fastening the articulated link portion of said mat to the border strips.

12. An articulated mat comprising a plurality of rubber links, pivot rods extending through said links to pivotally connect the same with each other and metal connecting links for said pivot rods adjacent the ends of said rods for connecting all of said rods to each other in a direction longitudinally of said links, and to maintain said rods in proper spaced relation to each other, the links being arranged in staggered relation on opposite sides of the outermost layer of links so as to lie closely against same.

13. An articulated mat comprising a plurality of elongated rubber links arranged in staggered side-by-side lapping relation with respect to one another, pivot rods extending through the overlapping ends of said links for connecting the same together, adjacent pairs of rods having metal links arranged thereon beyond the rubber links pivoted thereon, the ends of said rods being connected to each other to form a loop, a sleeve for connecting said ends, a border strip having an edge groove therein arranged to receive said connected ends of said rods and said sleeve whereby said border strip lies closely adjacent the metal links connecting said rods and over said ends and sleeves, whereby to conceal said bent ends, and means for connecting some of said pivot rods to said border strip to hold said border strip closely adjacent the endmost links on the pivot rods.

14. An articulated floor mat comprising a plurality of rubber links arranged in staggered side-by-side lapping relation with respect to one another, pivot rods extending through the overlapping ends of said links for connecting the same together, the endmost rod having spacer elements between the endmost links to laterally brace said endmost links continuously from one end of said rod to the other, a border strip adjacent said endmost rod having a longitudinal opening therein substantially parallel to said rod, transverse recesses in said strip in the edge thereof adjacent said rod and arranged entirely below the upper tread surface of said strip, said recess communicating with said longitudinal opening, and metal links of lesser thickness in a vertical direction than the rubber tread links pivoted to said endmost rod between said links and spacers, and extending into said recesses, said metal links having perforations arranged in alignment with said opening in said strip when said strip is arranged close to the ends of said endmost links and said spaced elements, and retaining means extending through said openings and the perforations in said metal links for holding said border strip in the aforesaid relation with said endmost strips and spacer elements.

15. In a mat having a plurality of links pivoted on suitable connecting means extending through the openings in said links, the combination with said links and means of a border strip having at least one flexible element extending longitudinally thereof and forming means for connecting said first means to said strip, said border strip being of rubber and the ends of said flexible elements being securely vulcanized in said rubber to prevent longitudinal shifting thereof.

16. An articulated floor mat comprising a plurality of tread links arranged in staggered side-by-side lapping relation, pivot rods connecting said tread links, a nosing strip disposed along at least one marginal edge of said mat, said nosing strip having a hole extending longitudinally therethrough near the inner edge thereof and a plurality of transversely extending recesses intersecting said hole at intervals and extending inwardly toward said marginal edge of said mat, said hole and recesses being arranged entirely below the upper surface of said nosing strip to leave an unbroken upper tread portion on said nosing strip, metal connecting links on the mat arranged at said marginal edge of the assembled tread links and having means thereon projecting outwardly from said marginal edge, said projecting means being of approximately the size of said recesses in the nosing strip and extending into said recesses and having perforations therein in alignment with said hole in said nosing strip when in assembled relationship, and means extending through said hole and passing through said perforations for holding said nosing strip against movement away from the edge of said mat.

17. In a flexible mat, the combination with a central tread portion having marginal edges and a nosing strip arranged at least on one of said marginal edge of said tread portion and having a longitudinal opening therein with transverse recesses communicating with said opening, and with the inner edge of said nosing adjacent said marginal edge of said tread portion, said recesses and opening being arranged entirely below the upper surface of said nosing strip to provide an upper unbroken tread surface thereon, metal links for connecting said tread portion with said nosing comprising one or more members of approximately the size of said recesses, extending into said recesses and having perforations therethrough in alignment with the longitudinal opening in said nosing, means extending through said hole and through said perforations for connecting said links to said nosing, and means for connecting said links to said tread portion.

HARRY R. RUSSON.